APPARATUS FOR PLYING STRANDS
Original Filed Oct. 21, 1965 3 Sheets-Sheet 1
FIG. 1
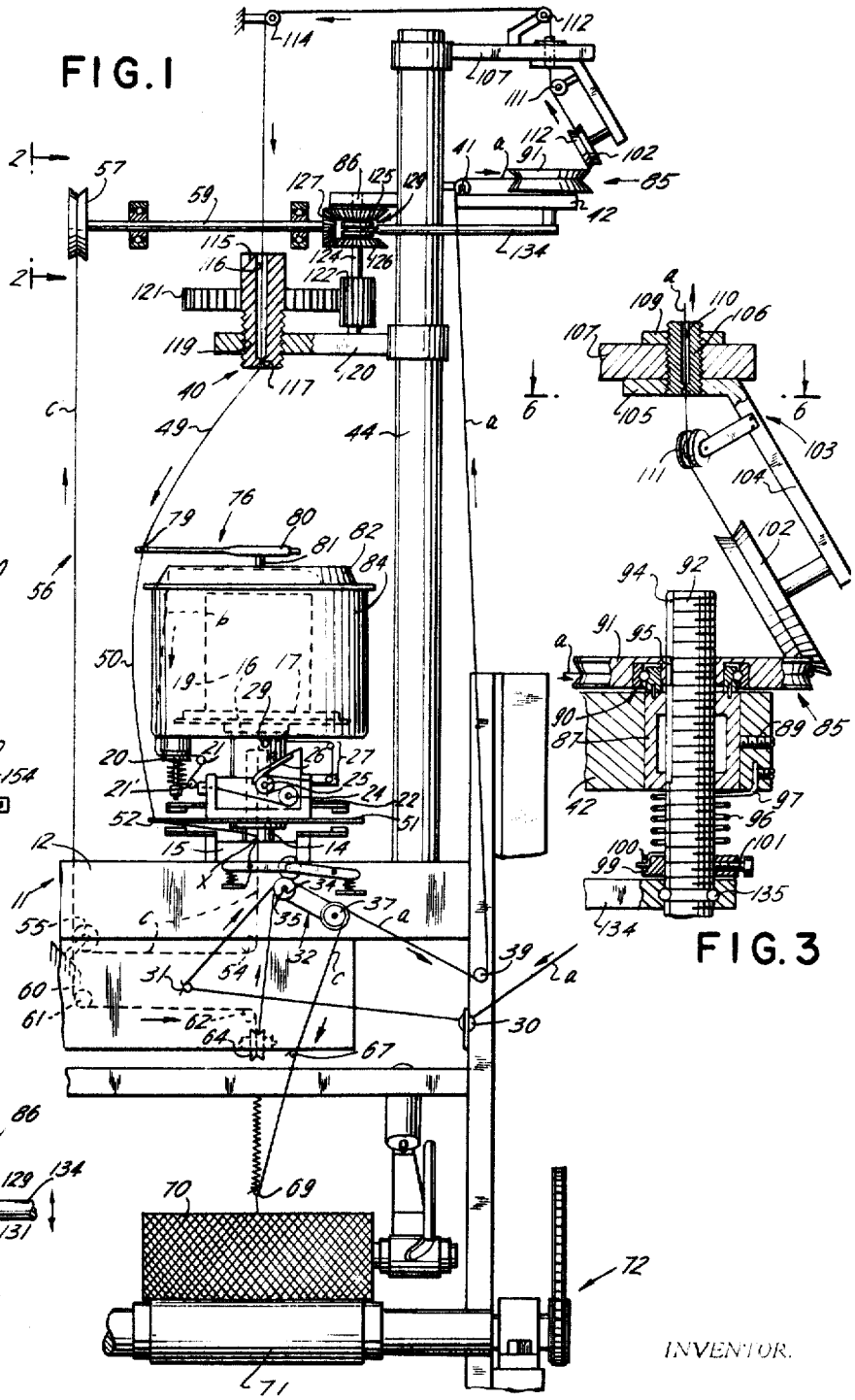
FIG. 2
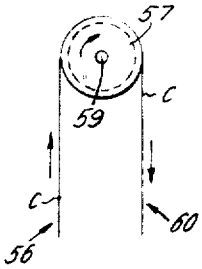
FIG. 8
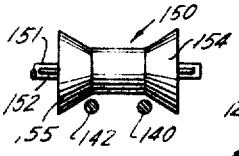
FIG. 4
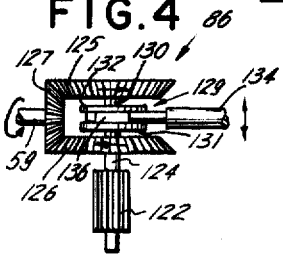
FIG. 3
INVENTOR.
Alfred W. Vibber

APPARATUS FOR PLYING STRANDS

Original Filed Oct. 21, 1965 3 Sheets-Sheet 2

INVENTOR.

Alfred W. Vibber

APPARATUS FOR PLYING STRANDS

Original Filed Oct. 21, 1965 3 Sheets-Sheet 3

INVENTOR.

Alfred W. Vibber

United States Patent Office

Re. 26,735
Reissued Dec. 9, 1969

26,735
APPARATUS FOR PLYING STRANDS

Alfred W. Vibber, 560 Riverside Drive,
New York, N.Y. 10027

Original No. 3,290,873, dated Dec. 13, 1966, Ser. No. 500,387, Oct. 21, 1965. Application for reissue Dec. 5, 1968, Ser. No. 785,830
Int. Cl. D01h *7/90, 3/04, 1/10*
U.S. Cl. 57—58.3 18 Claims

Matter enclosed in heavy brackets [ ] appears in the original patent but forms no part of this reissue specification; matter printed in italics indicates the additions made by reissue.

*ABSTRACT OF THE DISCLOSURE*

*A strand twisting and/or plying spindle of the balloon creating type, such spindle including means for controlling the tension of the balloon. The illustrative spindles are downtwisters, in which the strand enters the balloon at its apex and leaves the balloon at the driven balloon creating disc or flyer. Means are provided for controlling the tension of the strand in the balloon, such means comprising tension sensitive means disposed to engage the run of the strand extending between the feeding means and the loop, movable means for controlling the size of the loop, a separate source of power for selectively driving the movable means, and means responsive to the tension sensitive means for controlling the application of power from said separate power source to the movable means for controlling the size of the loop.*

This application is a continuation-in-part of application Ser. No. 376,820, filed June 22, 1964.

This invention relates to an apparatus for twisting and/or plying strands of the type having a rotating strand loop or balloon, to the combination of such apparatus and a novel device for detecting the tension of the strand in the rotating strand loop or balloon, and particularly relates to an apparatus for plying strands together by rotating one strand about a source of supply of another strand and plying the strands together beyond such source of the other strand.

Reinforcing cord such as that employed in automobile tires, V-belts, and the like usually consists of two strands twisted about each other but themselves having a relatively low twist. Such cord has been made in the past by twisting the two singles strands separately in the same direction, following which the twisted singles strands are doubled by being twisted together in the direction opposite the direction of twist of the singles strands. Such method involves three separate twisting operations, and, when the twisted singles strands do not flow continuously to the doubling spindle, also involves the taking up and the paying out of twisted singles strands.

To reduce the number of operations involved in the making of such cord, as well as the number of twisting spindles required with their space and power requirements, a number of different single spindle devices of the skip type have been proposed. In one of these types, such as shown in Clarkson Patents Nos. 2,503,242 and 2,729,051, the two singles strands are fed at substantially constant speed by separate constantly driven capstans to a plying point from which they are withdrawn under substantially constant tension. In another type of plying spindle, the strand to be ballooned enters the balloon through a storage disc, the outer ballooning strand being plied with an inner strand at a floating plying point near the apex of the balloon. In yet another type, such as shown in my prior Patent No. 2,857,730 and Clarkson Patent No. 2,986,865, the singles strands are fed toward the plying point by separate capstans driven at constant speed, and are withdrawn from the plying point at a variable speed, such speed being governed by variations in the tension of the outer, ballooning strand.

The present invention, in some aspects thereof, represents an improvement upon applicant's pendings application Ser. No. 376,820, filed June 22, 1964, although it is obviously not confined to use with the apparatus there shown, as will be pointed out below. The present invention is illustrated in connection with embodiments of twisting apparatus similar to those shown in such application Ser. No. 376,820, which eleminates the need for a constant tension take-up of the plied strands, with its attendant complications and need for frequent maintenance. At the same time, it gives much closer control of the plied cord from the standpoint of uniformity than does plying apparatus employing a floating plying point. Additionally, such apparatus takes up the plied cord at constant speed, thereby producing cord of a high uniformity of twist.

In accordance with the embodiments of the apparatus shown herein, the tension of the ballooning strand is controlled by varying the height of the balloon or loop. The balloon height is governed, is accordance with the present invention, not by varying contact between an annular member and the rotating loop or balloon, as in applicant's Patent No. 3,153,893, October 27, 1964, but in response to variations in a tension-sensitive means engaging a travelling non-ballooning strand or cord associated with the system of the spindle. In the first embodiments of apparatus to be described, the strand thus engaged is the outer singles strand, the tension-sensitive means engaging such strand between the constant speed feeding capstan for such strand and the entering end of the balloon. In the apparatus of application Ser. No. 376,820, the tension-sensitive means per se is employed to adjust the height of the apex guide. In the apparatus in accordance with the present application, on the other hand, the apex guide is adjusted by a power means separate from but under the control of the tension-sensitive means. As a result, in the apparatus of the present invention the tension of the strand in the rotating loop or balloon can be more closely controlled and made to equal the tension to which the strand from the inner package is subjected as it approaches the plying point.

The present invention has among its objects the provision of a novel mechanism for detecting the tension of the strand in the rotating balloon or loop of a twisting and/or plying spindle, and for controlling such tension by the use of such tension detecting mechanism.

The invention has among its further objects the provision of a plying spindle of the skip type employing such novel balloon control.

Another object of the invention lies in the provision of such balloon control in a spindle of the indicated type wherein the taking up of the plied strand from the plying point takes place at substantially constant speed, whereby the desired number of twists per unit length of the plied cord may be accurately maintained throughout the length of the cord.

A further object of the invention lies in the provision of such balloon control in a spindle of the skip type wherein correlation between the tensions in the two strands approaching the plying point is more easily achieved, and wherein such tensions may both be readily adjusted, the tension in the balloon being adjustable in a novel manner.

The above and further objects and novel features of the invention will more fully appear from the following description when the same is read in connection with the accompanying drawings. It is to be expressly understood, however, that the drawings are for the purpose of illustration only, and are not intended as a definition of the limits of the invention.

In the drawings, wherein like reference characters refer to like parts throughout the several views.

FIG. 1 is a fragmentary view in side elevation of a first embodiment of a spindle for plying strands together to form a cord in accordance with the present invention;

FIG. 2 is a view in end elevation of a part of the source of power for the balloon size controlling mechanism employed in the apparatus of FIG. 1, the view being taken from line 2—2 of FIG. 1;

FIG. 3 is an enlarged view partially in side elevation and partially in vertical section of the tension-sensitive means employed in the balloon control device of FIG. 1;

FIG. 4 is an enlarged view in side elevation of the power disconnecting and motion reversing means employed in the balloon control device used in the apparatus of FIG. 1;

FIG. 8 is an enlarged view in plan of the power disconnecting and motion reversing device of the apparatus of FIG. 7, the view being taken from line 8—8 of FIG. 7;

Figure 10:
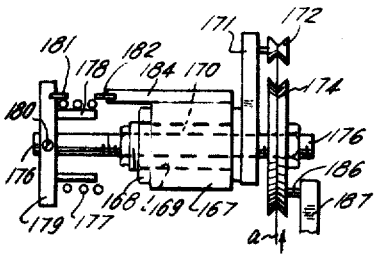
FIG. 10 is a view partially in end elevation and partially in vertical section through the tension-sensitive means employed in the apparatus of FIG. 7, the section being taken along the line 7—7 of FIG. 7.
Figure 11:
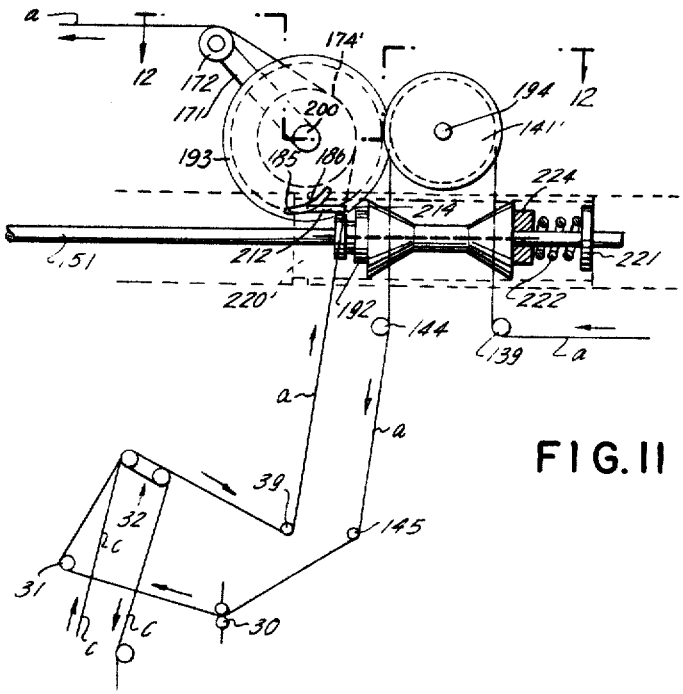
FIG. 11 is a fragmentary view in side elevation of a third embodiment of apparatus in accordance with the invention.
Figure 12:
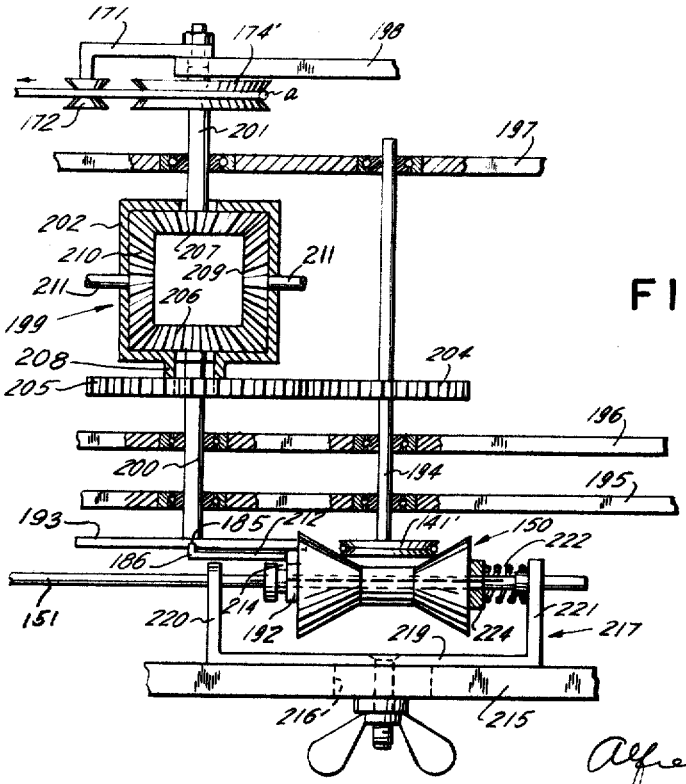
FIG. 12 is a fragmentary view partially in plan and partially in horizontal section through the apparatus of FIG. 11, the section being taken along the line 12—12 of FIG. 11.

As will be apparent from the above, three embodiments of apparatus in accordance with the invention are shown herein, the first embodiment being shown in FIGS. 1–6, inclusive, the second being shown in FIGS. 7–10, inclusive, and the third being shown in FIGS. 11 and 12.

The first two embodiments differ as to the source of power for adjusting the balloon or loop apex guide, as well as the means whereby the tension-sensitive means controls the application of power from said source to the apex guide adjusting means. In both said first two embodiments the strand-engaging body of the tension-sensitive means is at rest when the strand in the rotating loop or balloon is under a desired predetermined tension, such body being urged by yieldable means opposing its rotation in the direction of the travel of the strand thereover. In the third embodiment of the apparatus, shown in FIGS. 11 and 12, the strand-engaging body of the tension-sensitive means rotates at a surface speed somewhat less than the speed of travel of the strand thereover when the strand in the rotating loop or balloon is under a desired predetermined tension; such body is urged by yieldable means opposing its rotation in the direction of the travel of the strand thereover. In all of the disclosed embodiments, upon a change in one direction in the surface speed of the body relative to the speed of the strand passing thereover the apex guide is adjusted in one direction, and upon a change in the other direction in the surface speed of the body relative to the speed of the strand passing thereover, the apex guide is adjusted in the other direction.

In the embodiment of the apparatus shown in FIGS. 1–6, inclusive, the spindle is generally designated by the reference character 10. Such spindle is supported on a frame 11 having a horizontal enclosure portion 12 within which is contained driving mechanism for the hollow main vertical shaft 14 of the spindle which is rotatably mounted in a bearing housing 15 secured to enclosed portion 12. Non-rotatably mounted on shaft 14 is a fixed support 16 upon which a package support 17 is mounted in turn. Support 16 is held from rotation by cooperating upper and lower magnets between which the flyer disc 51 rotates. An inner strand package 19 on support 17 supplies an inner strand b. Strand b is paid off package 19, travels upward and then across the top of the package as indicated in dash lines in FIG. 1, and then proceeds downwardly to pass through a pre-tensioner 28 of the spring pressed washer type. From pre-tensioner 20, the strand b passes to a guide pulley 21 and thence to a tensioning device 22.

The strand handling device 22 on support 16 of the present apparatus is an idle strand tensioning means which is preferably adjustable to vary its strand tensioning effect. The tension device 22 shown is generally similar to that shown in FIG. 5 of the patent to Klein, No. 2,671,305, changed as to its orientation and the manner of feeding the strand into and away from the tension device. It is to be understood that other known strand tensioning devices may, if desired, be substituted for the tensioning device 22 here shown and described.

The strand b, after passing under guide pulley 21', travels to the right (FIG. 1) initially to contact the right-hand roller 24 at the bottom thereof, and then travels counterclockwise around the roller to contact the left-hand roller 25 adjacent the bottom thereof. The strand then travels clockwise around roller 25 and between such roller and an adjustably tensioned leaf spring 26 which has a curved free end overlying and conforming to the curvature of the roller 25. As set forth in the above Klein patent, the ends of the shafts mounting rollers 24 and 25 are supported in guideways (not here shown) which lie generally parallel to the direction of the runs of the strand approaching roller 24 and leaving roller 25, the tension in the strand and the force exerted on the roller 25 through strand b by the leaf spring 26 causing the strand to be nipped forcibly between the rollers. The leaf spring 26 is secured at its upper end to support 16; the spring is adjustably thrust toward roller 25 by a set screw threaded into a bracket affixed to support 16.

From the top of roller 25 the strand b travels to the right to a roll guide set 27, and thence progresses to a canted fixedly journalled guide roll 29 which directs it downwardly centrally into the open upper end of the hollow main shaft 14 of the spindle. Strand b is pulled downwardly through the bore in shaft 14 to meet and be plied with a second strand a at a plying point X within the shaft.

The outer, ballooned strand a is fed to spindle 10, in a direction from right to left, as from a multiple end beam as in Clarkson Patent No. 2,986,865. Strand a passes through a fixed guide 30 on the frame of the spindle, to a further fixed guide 31, and thence upwardly and to the right to a first, singles feeding portion of a combined capstan device generally designated 32. The construction and manner of operation of capstan 32 are illustrated most clearly in FIG. 5. Projecting forwardly from housing 12 is a horizontal shaft 34 which is driven in synchronism with and by the main shaft 14 of the spindle 10 by means such as gears not shown. Secured to shaft 34 is a stepped roller having a larger, forward circular cylindrical portion 35. Mounted on a bearing on a fixed, undriven stub shaft 36 projecting forwardly from housing 12 at a point spaced from shaft 34 is an idle roller 37. The outer strand a rises from guide 31 to pass clockwise over driven roller 35, passes over idle roller 37, and then repeatedly passes around such rollers in spaced runs, finally leaving roller 35 to pass to the right under a fixed roller guide 39, thence to a roller guide 41 on a cross arm 42 on a standard 44, and finally to an apex guide and balloon control device 40 to be described.

The described portion of the composite capstan 32 is provided with an idle presser roller 45 mounted on a lever 46 which is spring pressed to nip the runs of strand a between it and roller 35. The strand a is thus forwarded at substantially constant speed to the apex guide 40 and thence into the balloon which in this instance has an upper portion 49 and a lower portion 50.

The balloon is generated by a flyer disc 51 which is fixed to shaft 14 of the spindle to rotate therewith. The strand a passes through an eye 52 in the outer edge of disc 51, and thence generally radially inwardly to pass into an opening through the wall of shaft 14 to a cord forming die at the plying point X, where equal lengths of strands a and b are wrapped about each other to form cord c.

From the plying point X the cord c passes down through the lower end of the hollow main shaft 14 and thence downwardly to a fixedly mounted guide roller 54. From roller 117 cord c passes to the left under a further fixedly mounted guide roller 55 and thence rises in a run 56 to pass over a guide pulley 57 fixed to a shaft 59 so that passage of cord c about pulley 57 drives the shaft 59. Shaft 59 supplies the power for the adjustment of the apex guide 40 in a manner to be described. Cord c travels 180° about pulley 57, and leaves it to pass downwardly in a run 60 leading to a fixed guide pulley 61 on frame 12. From pulley 61 the cord c passes to the right and over and under fixed guide pulleys 62 and 64, respectively. From roller 64 cord c rises to pass over the inner, smaller, diametered circular cylindrical portion 65 of the stepped roller affixed to driven shaft 34. The cord c then passes over an inner idle guide roller 66 rotatably mounted on shaft 36. Roller 66 is separate from and rotates independently of roller 37. After passing in multiple spaced runs about rollers 65 and 66, the cord c leaves the capstan by passing downwardly partially around roller 66 to a fixed guide 67 and a movable guide 69 which is traversed by means not shown to lay the cord upon a package 70 which is frictionally rim driven by a pair of rollers upon which it rests. One such driving roller, designated 71, is shown in FIG. 1 driven by means generally designated 72.

The portion of the capstan 32 which forwards cord c from the plying point X does so at substantially constant speed. Slippage of the cord on roller 65 is minimized by an idle presser roller 74, which is separate from and independent of presser roller 45. Roller 74 is mounted on a lever 75 which is spring pressed to urge the roller 74 forcibly against the portions of the cord lying between rollers 65 and 74.

The spindle 10 is provided with an auxiliary idle flyer 76 having an arm 77 with a guiding eye 79 therein through which the strand a of the balloon passes. Flyer 76 has an arm 80 extending oppositely from arm 77 for the purpose of counterbalancing the flyer. The bearing 81 for the flyer 76 is mounted on the removable lid 82 of an enclosure 84 disposed about package 19 and supported on the non-rotatable member 16 on shaft 14.

As shown, the eye 79 of the auxiliary flyer 76 lies outwardly of the shaft 14 of the spindle 10 at a radial distance which somewhat exceeds that of the eye 52 through the flyer disc 51. The upper portion 49 of the balloon thus always lies in the first quadrant, that is, the strand a always enters the eye 79 of the auxiliary flyer at an angle which is less than 90°, measured inwardly toward the axis of the flyer, between the plane of rotation of the flyer and a normal thereto at eye 79. It has been found that the use of the auxiliary flyer 130 permits the use of a higher tension of strand a in the balloon and a higher speed of rotation of the spindle shaft 14 than would be permissible without it, and that the auxiliary flyer assures the maintenance of portion 50 of the balloon free from contact with any fixed structure such as the lid 82 or the body 84 of the guard about package 19.

The auxiliary flyer 76 acts in effect to create and maintain a short balloon 49 between it and the apex guide of device 40, the tension in such short balloon apparently being the primary determining factor as to the tension existing in the entire revolving loop 49, 50 which consists of the short balloon 49 and the length of rotating strand in the balloon portion 50 between the auxiliary flyer and the driven flyer disc 51. Such length of strand in balloon portion 50 serves primarily to drive the auxiliary flyer; in any event, the tension variations caused by variations in the length of strand in portion 50 of the balloon are additive to those of the short balloon 49.

The short balloon 49 is a single balloon which spins "above the bulge," that is, the balloon 49 has no true maximum diameter at all, because such "bulge" is situated in the imaginary continuation of the short balloon 49 below the auxiliary flyer 76. In such short balloon 76 the yarn tension is high, and an increase in the diameter of the short balloon 76 results in a greater yarn tension. See pages 20 and 21 of "Balloon Control" by Grishin, revised and reprinted by T.M.M. (Research) Limited, from Platts Bulletin, copyright 1956, by Platt Bros. (Sales) Limited, Oldham, England.

In the system of FIGS. 1–6, inclusive, the plying point X never is, by itself, a compensator for variations in balloon diameter. The use of the auxiliary flyer thus requires for all conditions of operation of the apparatus, that is, with yarn of uniform or yarn of varying unit weight, a balloon compensator which responds to variations in balloon diameter. This follows from the fact that with an increase in the diameter of the balloon, the tension in the strand a increases, whether the weight per unit length of the strand remains constant or increases. Thus, the plying point per se can not function to restore the balloon to the diameter at which the balloon has the desired tension equalling that imposed upon strand b as it approaches the plying point.

The plying point X, however, acting in conjunction with the balloon control device 40 to be described, maintains the balloon 49, 50 under stable control. Thus, upon an increase in diameter of the balloon, regardless of the cause, the balloon control device 40 acts to decrease the height of balloon portion 49, and thus to decrease the tension in strand a as it approaches the plying point. Upon such decrease of tension in strand a, the plying point functions to cause strand a to be absorbed into the cord c at a greater rate, thereby decreasing the diameter of the balloon 49, 50 to a predetermined desired value. When the diameter of the balloon 49, 50 decreases unduly, the balloon control device 40 acts to increase the height of the balloon portion 49, whereby the plying point X then functions to cause strand a to be absorbed into the cord c at a slower rate, thereby increasing the diameter of the balloon 49, 50 to a predetermined desired value.

The apparatus of FIGS. 1–6, inclusive, employs a tension sensitive device 85 which is disposed frictionally to engage the outer singles strand a in the run thereof between the constant speed feeding means 35, 37 of capstan 32 and the rotating loop or balloon 49, 50. Device 85 is of such character that at no time does it alter the length of the run of strand a between such capstan and the balloon despite its response to varying tensions in such strand. As a consequence, device 85 does not add any variables to the system. Device 85 is connected in a manner to be explained to a power disconnecting and motion reversing means 86 which is interposed between the source of power 57, 59 and the means for adjusting the apex guide 40.

Figure 5:
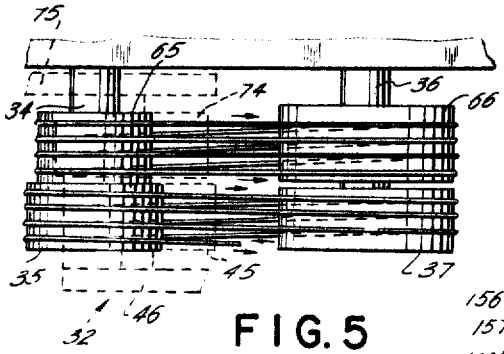
FIG. 5 is a fragmentary somewhat schematic view in tilted plan of the combined capstan employed in the apparatus of FIGS. 1 and 7 which serves to feed the outer singles strand toward the balloon at constant speed and the plied cord away from the plying point at constant speed.
Figure 6:
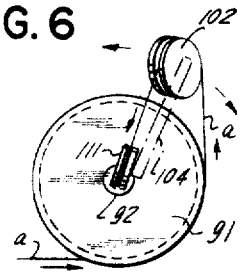
FIG. 6 is a simplified view in horizontal section of the tension-sensitive means employed in the balloon control device of FIG. 1, the section being taken along the line 6—6 of FIG. 3.

The tension-sensitive means 85 is shown most clearly in FIGS. 3 and 6. As there shown, the overarm 42 is provided with a vetrically disposed nut 87 therein, the nut being held in the arm by a set screw 89. A bearing 90 is mounted immediately above the arm 42, the inner race of the bearing being held from rotation as by pins extending therefrom into the upper end of the nut 87. Mounted upon the outer race of the bearing 90 is a horizontally disposed grooved pulley 91 about which the strand a is wrapped to an adjustable degree, as shown in FIG. 6. Passage of the strand about the surface of the pulley 91 thus tends to turn the pulley in the direction of travel of the strand, the torque which the strand imposes on the pulley varying with the tension in the strand for a given adjusted angle of wrap of the strand about the pulley. As we have seen, in the system shown the tension in the singles strand a increases upon an increase in diameter of the loop or balloon 49, 50 and decreases with a decrease in such diameter. Thus the degree of turning of the pulley 91, which is opposed from rotation in the direction of travel of the strand thereover by means to be described, affords a measure of balloon diameter. When the balloon diameter is stable and at the desired value, the pulley 91 remains non-rotating, the strand then sliding thereover. When, however, the balloon diameter varies appreciably from such predetermined desired value, the pulley 91 rotates in the appropriate direction to adjust the apex guide 40 to restore the tension in the balloon to the desired value and thus to restore the balloon to the desired diameter.

Threadedly mounted in the nut 87 is a screw 92 having an axially extending groove 94 in its upper end. A radially extending key 95 secured to pulley 91 extends into groove 94 so that the pulley rotates the screw 92 while permitting the screw to rise or fall in nut 87 relative to the pulley. Rotation of screw 92 in the direction of the travel of the strand a thereover is opposed by a coil torque spring 96 telescoped over the lower end of the screw 92. The upper tang 97 of spring 96 is secured to the end of the overarm 42 as shown, the lower tang 100 being secured to a collar 99 which is telescoped over the screw 92 adjacent its lower end. The collar 99 is secured to the screw by a set screw 101, which permits the spring 96 initially to be wound to a desired torque by turning the collar relative to the screw.

After passing partially above the pulley 91, the strand a passes tangentially thereof to a canted idle guide roller 102 which is journalled on a stub shaft secured to the lower end of an arm 104 of a frame 103. The upper end of arm 104 is secured to a horizontal plate member 105 which has a vertical hollow shaft 106 secured thereto at its lower end. Shaft 106, which is threaded at its upper end, extends freely through a vertical bore in a further overarm 107 secured to the standard 44. A nut 109 screwed onto the upper end of the shaft 106 secures the frame 103 in the desired adjusted position about the axis of the shaft 106 to cause the strand a to be wrapped for a desired angle about the pulley 91. After passing over the canted pulley 102, the strand a rises to a further idle grooved guide pulley 111, the root of the groove of which is disposed tangential to the axis of the bore 110 in the hollow shaft 106. The strand a is led through bore 110 to an upper idle guide pulley 112 and thence travels laterally to a further guide pulley 114 which is disposed axially above the apex guide 40.

The apex guide 40 includes a vertically disposed hollow shaft 115 having an axial bore 116 therethrough. Adjacent the lower end of bore 116 there is a smoothly curved constricted annular zone 117 which functions as the apex guide proper for the balloon. Shaft 115 is threaded in its lower and intermediate portions and is threadedly received in a bore 119 in an overarm 120 on the standard 44. It is thus apparent that rotation of the shaft 115 will raise or lower the apex guide depending on the direction of such rotation.

Fixed to the shaft 115 adjacent the upper end thereof is a large spur gear 121 which is in constant mesh with a vertically disposed elongated pinion 122, such pinion being affixed to a vertical shaft 124. Shaft 124 is journalled in suitable bearings, the lower of which is supported in the overarm 120 and the upper of which is supported in a further overarm, as shown. As more particularly shown in FIG. 4, mounted upon the upper end of shaft 124 so as to be freely rotatable with respect thereto is a pair of oppositely facing bevel gears 125 and 126 which are in constant mesh with a bevel gear 127 affixed to the shaft 59. The gears 125 and 126 rotate in opposite directions, as shown by the arrows. A shiftable spool 129 is mounted upon shaft 124 between the gears 125 and 126, such spool being keyed to the shaft as by a member projecting inwardly from the spool and slidably engaged in an axially extending groove 130 in the shaft. When the spool 129 is disposed as shown in FIG. 4, spaced from both gears 125 and 126, the apex guide adjusting means is disconnected from the power source 57, 59. The spool 129 is provided on its lower and upper surfaces with friction coatings 131, 132, respectively. When the spool is thrust downwardly against the upper surface of the gear 126, the spool and the shaft 124 rotate in the direction of rotation of the gear 126. When, however, the spool 129 is raised to bring the surface 132 thereof into engagement with the lower surface of the gear 125, the spool and the shaft 124 rotate in the opposite direction, that is, in the direction of rotation of the gear 125.

The selective shifting of the spool 129 is controlled by the tension-sensitive device 85. Thus mounted on the lower end of the screw 92 of the tension-sensitive device is an arm 134, there being a bearing 135 between the screw 92 and the arm 134 so as to permit the screw to rotate freely with respect to the arm. The arm 134 is provided with a fork or yoke 136 on its outer end, such yoke being received within an annular groove intermediate the length of the spool 129. It will be assumed that the torque spring 96 of the tension-sensitive device 85 has been initially wound to the correct degree and that the frame 103 of such device has been adjusted to provide the correct angle of warp of strand a about the pulley 91. With a correct adjustment of the height of the apex guide 40 and with a predetermined weight per unit length of strand a, the balloon 49, 50 will be of a desired diameter when the tension in such balloon equals the tension imposed upon strand b by the tensioning device 22 therefor. Under such conditions, because of the equality of tension in the two strands approaching the plying point x, equal lengths of strands a and b will be incorporated in the cords c being formed.

If, however, the diameter of the balloon 49, 50 should increase for any reason as, for example, an increase in weight per unit length of the strand a, the tension in the strand a approaching the plying point x will increase. This causes the pulley 91 of the tension-sensitive device 85 to rotate in the direction of travel of the strand a, thereby causing the screw 92 to travel in the axial direction appropriate to correct such tension imbalance. Thereupon the arm 134 shifts the spool 129 of the means 86 so that the shaft 124, through the gears 122 and 121, rotates to lower the hollow shaft 115 bearing the apex guide 117. Such rotation of the shaft 115 continues until the pulley 91 of the tension-sensitive means 85 has been restored to its initial position, thereby shifting the spool 129 of means 86 into its neutral position (FIG. 4), in which the source of power is disconnected from shaft 115. It will be obvious that the tension-sensitive means 85 and the power control means 86 function to adjust the apex guide 40 in an appropriate direction upon a decrease in diameter of the balloon 49, 50 and thus upon a decrease in tension of the strand a approaching the plying point.

It will be obvious that the power source 57, 59 may be replaced by other suitable sources of power, such as a synchronous electric motor, or a shaft driven directly from the main shaft 14 of the spindle. The driving of pulley 57 by the cord c, however, is convenient and does not introduce any variables into the system, because the cord c is withdrawn from the spindle by the capstan 65, 66 at a constant speed. The pulley 57 merely adds a small additional retardation to the cord without, however, varying the speed of its withdrawal from the spindle. It will also be apparent that, as an alternative, the entering singles strand a may be employed as the source of power for the apex guide adjusting means when the power for this purpose is taken from the strand a at a zone thereof in which it is approaching the constant speed feeding means 35, 37. This will be more readily apparent upon consideration of the second and third embodiments of apparatus in accordance with the invention, which are shown herein in FIGS. 7–10, inclusive, and in FIGS. 11 and 12, respectively.

Figure 9:
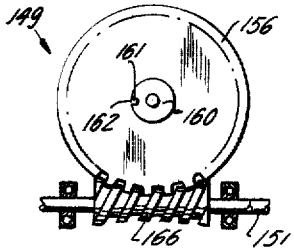
FIG. 9 is a view in plan of the gear means for adjusting the apex guide for the loop or balloon of the apparatus of FIG. 7.
Figure 7:
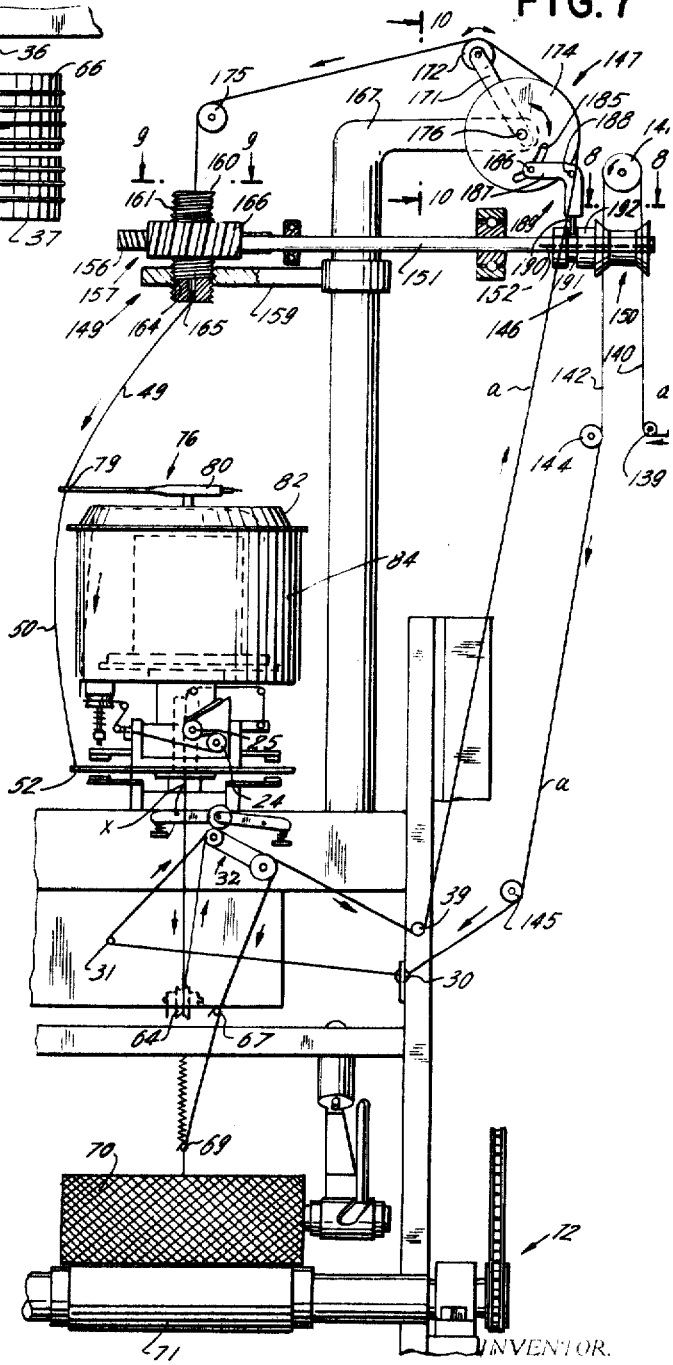
FIG. 7 is a fragmentary view in side elevation of a second embodiment of twisting and plying spindle in accordance with the present invention.

The embodiment of spindle shown in FIGS. 7, 8, and 9 is similar in its main elements to that shown in FIGS. 1–6, inclusive, and above described. Consequently, the same reference characters are employed in FIGS. 7, 8, and 9 to designate elements therein which are similar to those in FIGS. 1–6, inclusive. The spindle of FIGS. 7, 8, and 9 differs from that of FIGS. 1–6, inclusive, as to the source of power for adjusting the adjustable apex guide, the means for adjusting such guide, and the tension-sensitive means which controls the application of power to the means for adjusting the apex guide.

As shown in FIG. 7, the outer singles strand a is initially led to a first guide pulley 139 from which it rises in a first vertical run 140 to passover an idle guiding pulley 141. From pulley 141 the strand a passes downwardly in a second vertical run 142, which is parallel to run 140, to pass partially about a guide pulley 144 which is positioned at the same level as pulley 139. The runs 140 and 142 of the singles strand a selectively supply power in reverse directions to a mechanism 146, to be described, for driving the apex guide adjusting device of the apparatus. From pulley 144 the strand a passes downwardly partially about a further pulley 145 which leads it to the fixed guiding eye 30. The path of travel of the strand a from the eye 30 to the composite capstan 32 is the same as in FIG. 1. After having travelled in multiple wraps about the capstans 35, 37 of the composite capstan 32, the strand a is led off to pass beneath and partially around a further fixed idle guide pulley 39 from which it rises to pass partially about a grooved pulley 174, which is mounted on and fixed to a rotatable shaft 176, of a tension-sensitive means 147. From pulley 174 the strand a travels to an idle adjustable pick-off pulley 172 which is journalled on the outer end of an arm 171, as shown. The end of the arm 171 opposite that bearing pulley 172 is journalled, in a manner to be described, coaxial of a shaft 176 upon which the pulley 174 is mounted. From the pulley 172 the strand a travels to yet another guiding pulley 175 which is located so that its left-hand (FIG. 7) strand-guiding surface lies coaxial of the central bore through the hollow shaft 160 which carries the balloon apex guide proper 165 on its lower end. The adjustable apex guide mechanism as a whole is designated 149.

The runs 140 and 142 of the strand a, as will be seen, furnish the power for adjusting the height of the apex guide. Such runs of the strand a are located so that they are pulled by the constant speed singles strand capstan 35, 37; the portion of strand a which approaches such runs 140 and 142 is under appreciable tension, as by being fed from a retarded beam. Thus the power taken off the strand a at runs 140 and 142 thereof is not reflected in variations in tension which exist in the strand between the driven, constant speed capstan 35, 37 and the plying point X at the exit end of the balloon. The tension-sensitive means 147, however, is disposed to engage strand a between the capstan 35, 37 and the balloon, so that variations in the force of engagement between the strand a and the pulley 174 of the tension-sensitive means 147 are caused substantially solely by variations in the tension of the strand a in balloon 49, 50.

A horizontally disposed shaft 151 journalled in suitable bearings, as shown, carries a spool 150 on its right-hand end (FIG. 7), such spool being mounted for axial reciprocation relative to the shaft while being rotatable therewith, by reason of a radially inwardly projecting dog (not shown) on the spool which projects into a groove 152 which extends longitudinally of the shaft 151 in the peripheral surface thereof, as shown. The spool 150 has a first broad frusto-conical flange 154 on the right-hand end thereof and a similar but oppositely disposed broad frusto-conical flange 155 on the left-hand end thereof, such flanges converging toward each other. The shaft 151, spool 150, and pulley 147 are so disposed and are of such relative sizes that when the spool 150 is in its neutral, non-driving position, shown in FIG. 8, the runs 140 and 142 of the strand a lie close to but do not engage the respective flange 154 and 155 of the spool. In such position of the spool, power from the incoming strand a is disconnected from the shaft 151 and thus from the apex guide adjusting mechanism, to be described.

When, however, the spool 150 is thrust to the right (FIGS. 7 and 8) the flange 155 of the spool forcibly engages the run 142 of the strand a so that the spool in the shaft 151 is driven by the run 142 of the strand in the direction of travel of the strand in such run. In such position of the spool, the flange 154 thereof is spaced from run 140 of the single strand a. Conversely, when the spool 150 is thrust to the left, the flange 154 of the spool forcibly engages the run 140 of strand a thereby to turn the spool and the shaft 151 in the reverse direction, the flange 155 of the spool then being spaced from run 142 of the singles strand a. Such shifting of the spool 150 from its neutral, undriven position into either its right- or left-hand driven positions is under the control of the tension-sensitive means 147, now to be described.

The above-mentioned shaft 176, to which the pulley 174 is affixed, is mounted upon an overarm 167 which projects laterally from the standard 44 of the spindle. As shown in FIG. 10, a sleeve 170 is mounted for rotation in a horizontal bore 169 through the overarms 167. Journalled within the sleeve 170 is the shaft 176 to which the pulley 174 is fixed for rotation therewith. Fixedly secured to the forward end of the sleeve 170 is the above-mentioned arm 171, which may be angularly adjusted about the axis of the shaft 176 by loosening a nut 168 which is screwed upon the threaded rear end of the sleeve 170 and which overlies the rear surface of the overarm 167. The angular position of arm 171, and thus the angle of wrap of the strand a about the tension-sensitive pulley 174, may be adjusted by loosening nut 168, turning the arm 171 to the desired angle, and again tightening the nut.

Rotation of the pulley 174 in the direction of travel of the strand a thereover is opposed by a coil torque spring 177 which is telescoped about the rear end of the shaft 176. Spring 177 is positioned over a spring barrel 178 which is affixed to a disc 179 having a central hole through which the rear end of the shaft 176 extends. Spring 177 has a rear tang 181 which extends into and is affixed to the disc 179. The spring has a forward tang 182 which extends into and is affixed to an arm 184 whih is fixedly mounted on the overarm 169. The winding of the spring 177 may be adjusted by loosening a set screw 180 by which the disc 179 is affixed to shaft 176, suitably turning the disc relative to the shaft, and then tightening the set screw. Thus the torque with which the spring 177 opposes rotation of the pulley 174 by the strand a passing thereover may be adjusted if desired, during operation of the spindle.

When the tension in the balloon 49, 50 changes substantially from its desired, normal tension, the pulley 174 rotates in the appropriate direction, thereby to shift the spool 150 from its neutral position to the left or right, depending upon the direction of rotation of pulley 174. Thus, upon such rotation of pulley 174, the shaft 151 is driven in one of the respective opposite directions. Such control of the positioning of the spool 150 by the pulley 174 is affected as follows: Inwardly of its periphery the pulley 174 has an arcuate groove 185 which extends from radially outer end near but inwardly of the periphery of the pulley to a radially inner end adjacent the hub of the pulley. The groove 185 functions as a double-walled, parallel slide cam. Accurately fitting within the groove 185 is a horizontal pin 186 which acts as a cam follower, the pin 186 being affixed to a first arm 187 of a bell crank 189 which is journalled on a central pivot pin 188. The other, depending arms of the bell crank 189 has a yoke 190 affixed thereto, such yoke being received within an annular groove 191 in a left-hand hub extension 192 of the spool 150. It will thus be seen that upon the turning of the pulley 174 by the torque spring 177 in a clockwise direction, the spool 150 is pulled to the left, whereas upon rotation of the pulley 174 in a counter-clockwise direction, the pulley 150 is thrust into its right-hand driving position. Such sliding of the spool 150 in reverse directions causes the shaft 151 to be driven in a respective one of two reverse directions, thereby to affect adjustment of the apex guide mechanism 149 as follows:

The hollow shaft 160 of mechanism 149 is threaded into a vertical bore 164 in an overarm 159 which is affixed to the standard 44. Thus turning of the hollow shaft 160 in one direction raises the apex guide 165 proper and turning of the shaft 160 in the reverse direction lowers the apex guide. Mounted in a suitable bearing 157 in the overarm 159 is a worm gear 156, such worm gear having a radially inwardly projecting lug 162 (FIG. 9) which is slidably received within an axially extending groove 161 in the outer surface of the shaft 160. Thus turning of the worm gear 156 in reverse directions turns the shaft 160 in the same respective direction so that such shaft is either screwed up or down in the threaded bore in the overarm 159. The left-hand end of the shaft 151 is journalled in suitable bearings as shown, and has fixed thereto a worm 166 which is in mesh with the worm wheel 156. Thus turning of the shaft 151 in reverse directions affects the reverse turning of the hollow shaft 160 of the apex guide adjusting means 149 through the worm 166 and the worm wheel 156 meshing therewith. The worm and worm wheel are of such pitch as to be irreversible, that is, the vertical adjustment of shaft 160 can be affected only by turning shaft 151 in the appropriate direction. Thus the apex guide 165 remains at a fixed level when the spool 150 lies in its neutral, non-driven position.

The power required to turn the shaft 160 and thus to adjust the apex guide is small because of the marked reduction in speed of rotation from shaft 151 to shaft 160 produced by the worm and worm gear connection therebetween. Thus only a small additional retardation is imposed upon the strand a by its engagement with the spool 150 when the spool is in either of its right- or left-hand driven positions. This fact, plus the essentially non-slipping engagement between the strand a and the capstan 35, 37 which feeds it at constant speed toward the balloon, prevents the imposition of any uncontrolled variables upon the system even though power for adjusting the apex guide is derived from the incoming singles strand a.

The third embodiment of apparatus in accordance with the invention is illustrated in FIGS. 11 and 12. In such figures the plying spindle proper, which is the same as that of FIGS. 7, 8, 9, is omitted, and only the portion of the outer, ballooned singles strand a which enters the apparatus, supplies the power for the apex guide adjusting mechanism, and cooperates with the tension-sensitive means of the balloon control device as shown. In the apparatus of FIGS. 11 and 12, the tension-sensitive means and the means whereby it controls the application of power to the apex guide adjusting means are such that the tension-sensitive pulley rotates continually in the direction of travel of the strand a thereover, the difference between the speed of travel of the strand and the surface speed of the pulley being small. As a result, the wearing of the tension-sensitive pulley by the strand passing thereover is minimized.

Turning now to FIGS. 11 and 12, it will be seen that the outer singles strand a enters the apparatus under tension, as from a retarded beam, to pass under guide roller 139. From roller 139 the strand a rises in a first vertical run to pass 180° about a pulley 141' which is fixed to a shaft 194 journalled in suitable bearings in parallel frame members 195, 196, and 197. From pulley 141' the strand a passes downwardly in a second vertical run to a guide roller 144 lying at the same level as roller 139, and thence under a further guide roller 145. From there, the path of strand a to the singles strand feeding portion of the composite capstan 32 and away from such capstan is the same as in the embodiment of FIGS. 7, 8, and 9. From capstan 32 the strand a passes under a guide roller 39 and then rises to pass partially around pulley 174' of a tension-sensitive device. The strand is guided away from pulley 174' by an idle pulley 172 which is mounted on the outer end of an arm 171. Arm 171 is mounted on a frame member 198 so that its inner end is journalled coaxially of pulley 174'. The arm 171 may be angularly adjusted about the axis of pulley 174' by loosening the nut on the pivot pin on which the arm is mounted, turning the arm to cause strand a to have the desired angle of wrap about pulley 174', and then tightening such nut. From pulley 172 the strand a passes to a further guide pulley (not shown) from which it travels to the apex guide (also not shown) of the spindle.

The tension-sensitive pulley 174' is fixed to a shaft 201 which is journalled in frame members 197 and 198. Shaft 201 is one branch shaft of a differential gear device 199, which has a frame 202 within which are mounted four serially meshing bevel gears 206, 210, 207, and 209. The gears 209 and 210 are disposed opposite each other, and are journalled on aligned stub shafts 211 affixed to the sides of frame 202 which lie parallel to shaft 201. Gear 207 is affixed to shaft 201 and rotates therewith with respect to the frame 202. Gear 206 is affixed to a shaft 200, which is aligned with shaft 201; the gear 206 and shaft 200 are rotatable with respect to frame 202 of the differential gear mechanism 199.

The frame 202 of the differential gear device 199, which carries with it the gears 209 and 210, is driven to rotate about the common axis of shafts 200 and 201 by the shaft 194 through the medium of a gear 204 affixed to shaft 194 and a gear 205, which is affixed to the frame 202 of differential gear device 199 by a sleeve 208, gears 204 and 205 being in constant mesh. To the forward end of shaft 200 there is affixed a wheel 193 which controls the positioning of a spool-like element 150' by means of which the application of power from the incoming strand a is selectively applied to the shaft 151. Shaft 151 controls the adjustment of a balloon apex guide (not shown) in the same manner as in the apparatus of FIGS. 7, 8, and 9.

The wheel 193 has an inclined arcuate double-walled cam groove 185 in its forward face. In such groove there is disposed a pin 186 which acts as a cam follower; pin 186 is affixed to the outer end of a first horizontal arm 212 of an L-shaped member which has a lateral arm 214 in the form of a yoke. Yoke 214 is received within an annular groove in a hub 192 which extends from the left-hand end (FIG. 12) of the member 150' coaxially thereof. Rotation of the wheel 193 in either direction from the neutral position thereof shown in FIG. 11 thus thrusts the spool-like member 150' along shaft 151, to which it is keyed, to engage either the ascending or descending run of the strand a with a respective one of the frusto-conical flanges of such member, thereby to drive shaft 151 in reverse directions. As in FIGS. 7, 8, and 9, when the member 150' is in its neutral position the two runs of strand a, ascending to and descending from pulley 141', respectively, do not engage either of the flanges of member 150'.

The apparatus shown in FIGS. 11 and 12 includes adjustable means for yieldingly opposing rotation of wheel 193 and thus shaft 200 by the torque which is imposed upon them by the action of strand a in passing over the tension-sensitive pulley 174'. Such means includes a U-shaped bracket 217 having a base portion 219 and two spaced parallel arms 200 and 221. The arms have holes therethrough which journal the right-hand end of shaft 151 (FIG. 12) beyond the ends of the spool-like member 150'. The bracket is mounted for adjustment longitudinally of the shaft by a stud which projects forwardly from the base 219 of the bracket through a slot in a frame member 215 upon which the bracket is mounted. A wing nut and washer on such stud overlie the forward face of frame member 215, whereby the bracket may be held in adjusted position.

Telescoped over the shaft 151, interposed between arm 221 and a thrust bearing 224 on shaft 151, and abutting the right-hand end of member 150' is a coil compression spring 222 which constantly urges the member 150' to the left.

As is well known, with a differential gearing device $$(1)\quad 2S_3=S_1+S_2$$

Here $S_3$ is the angular speed of gear 205 and thus of the frame 202 of the differential gearing device, $S_1$ is the angular speed of branch shaft 201, and $S_2$ is the angular speed of branch shaft 200; and $$(2)\quad T_3=T_1+T_2$$

Here $T_3$ equals the torque applied to gear 205 and thus to the frame 202, $T_1$ is the torque applied to shaft 201 by the tension-sensitive pulley 174', and $T_2$ is the torque applied to shaft 200 by the spring 222, member 150', member 214, 212, and the cam groove 185 and cam follower pin 186 acting upon wheel 193. $T_3$ is a constant, due to the non-slipping engagement of strand a upon pulley 141'; hence $T_1=T_2$; that is, $T_{201}=T_{200}$.

It will be assumed that the bracket 217 has been adjusted so that spring 222 imposes such torque upon wheel 193 and shaft 200 that under normal tension of the balloon of the spindle the strand a travels somewhat faster than the surface speed of the tension-sensitive pulley 174', for example, on the order of 5% faster. Under such stable conditions, the tension of strand a in the balloon equals the tension imposed upon the inner strand by the constant tension device within the balloon.

When the tension in the balloon changes appreciably, as by increasing due to an increase in the weight per unit length of the strand a, the degree of slippage of the strand a upon the pulley 174' decreases due to the increased pressure which the strand a exerts upon the pulley; there is thus a resultant increase in torque imposed upon the pulley 174' by the strand a.

But $T_{201}=T_{200}$. Since $T_{201}$ (the torque imposed upon pulley 174' by strand a) has risen in the last assumed condition of the system, $T_{200}$ rises to an equal degree. The described system is so constructed and arranged that as $T_{200}$ increases, the cam groove 185 and cam follower pin 186 act, upon the tuning of wheel 193, to thrust the spool-like member 150' in such direction as to drive shaft 151 to move the apex guide downwardly, thereby to decrease the height of the balloon and thus the tension of the strand a in the balloon. Such downward adjustment of the apex guide continues until the tension in the balloon has decreased to its initial predetermined value thereof, that is, until it equals the tension imposed upon the inner singles strand by the constant tension imposing means within the balloon. Thereupon, the spool-like member 150' is shifted to its neutral, non-driving position, and the apex guide is then at rest in a new vertical position. It will be obvious that the same apex guide adjusting operations take place, but in the reverse direction, when the tension of the strand a in the balloon decreases from the desired predetermined value, the apex guide then being raised until the balloon tension is restored to its desired predetermined value.

It will be seen that in all three of the embodiments of apparatus disclosed herein the tension-sensitive means does not itself supply the power which is required to adjust the apex guide. Instead, such power is supplied by either an independent source or from one of the strands associated with the spindle, in the latter constructions the derivation of the requisite power from the strand being such as not to introduce any variables into the part of the system including in that order the capstan for feeding the single strand toward the balloon, the tension-sensitive means engaging such strand, and the balloon. The tension-sensitive means is of such character that neither by its response to or measurement of changes in tension of the ballooning strand, or by its control of the means supplying the power to adjust the apex guide, does it add any variables to the above-defined part of the system.

The tension-sensitive means acts to disconnect the source of power from the apex guide adjusting mechanism when the strand in the balloon is under a predetermined desired tension. When the balloon tension exceeds such value, the tension-sensitive means acts to connect the source of power to the apex guide adjusting means to drive it in the appropriate direction. Such driving of the apex guide adjusting mechanism continues until the tension in the balloon is restored to the said predetermined desired value, following which the tension-sensitive means acts to disconnect the apex guide adjusting means from the source of power.

Although a limited number of embodiments of the invention have been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention, as will now be apparent to those skilled in the art. Thus, although the invention has been shown and described in connection with its use in spindles of the strand plying skip type, it will be apparent that the invention may be used to advantage in twisting spindles of other types such as, for example, singles twisting spindles of either the uptwister or the downtwister type.

What is claimed is:

1. In strand-twisting apparatus, in combination, mechanism for rotating a travelling yarn strand material in the form of a loop, means beyond one end of the loop for feeding the strand at constant speed, and means for detecting the tension of the strand in the loop, said last named means comprising a body in the form of a rotatable solid of revolution mounted spaced from the loop to engage and divert the strand in the run thereof extending between the said one end of the loop and the means for feeding the strand at constant speed, passage of the strand over the body urging the body to rotate in the direction of travel of the strand in engagement therewith, means for yieldingly urging the body to rotate in the opposite direction, movable means for controlling the size of the loop, a separate source of power for selectively driving the movable means, and means responsive to rotation of the body for controlling the application of power from said separate power source to the movable means for controlling the size of the loop.

2. Strand-twisting apparatus as claimed in claim 1, wherein the body remains essentially at rest and the strand slips thereupon when the strand in the loop has a predetermined desired tension.

3. Strand-twisting apparatus as claimed in claim 1, wherein the body rotates in the direction of travel of the strand thereover but with a small predetermined slippage therebetween when the strand in the loop has a predetermined desired tension.

4. Strand-twisting apparatus as claimed in claim 1, comprising a central guide at the apex of the loop in the yarn, and wherein the means for controlling the size of the loop comprises means for adjusting said guide along the axis of the loop so as to vary the height of the loop.

5. Strand-twisting apparatus as claimed in claim 4, wherein the apparatus is of the skip-twisting plying type, and the means for feeding the first mentioned strand at constant speed engages such strand in advance of the apex guide for the loop and feeds such strand into the loop, and comprising a source of a second yarn strand within the loop of the first mentioned yarn strand, means for conducting the second strand from its source to a point where it plied with the first strand as the first strand leaves the loop, means for subjecting the second strand to tension in the run theoreof extending to the plying point, and means beyond the plying point for taking up the resulting plied cord.

6. Strand-twisting apparatus as claimed in claim 4, wherein the source of power is unidirectional, the means responsive to rotation of the body for controlling the application of power from said separate source of power to the movable means comprises a power disconnecting and motion reversing means connected between the source of power and the guide adjusting means, and wherein the body is connected to the power disconnecting and motion reversing means to control the same.

7. Strand-twisting apparatus as claimed in claim 6, wherein the apparatus is of the skip-twisting type, and the means for feeding the first mentioned strand at constant speed engages such strand in advance of the apex guide for the loop and feeds such strand into the loop, and comprising means for holding the material in the continuous portion thereof including the loop and said run thereof under tension with the loop as the only yieldably maintained salient zone in said portion, a source of a second yarn strand within the loop of the first mentioned yarn strand, means for conducting the second strand from its source to a point where it is plied with the first strand as the first strand leaves the loop, means for subjecting the second strand to constant tension in the run thereof extending to the plying point, and means beyond the plying point for taking up the resulting plied cord at constant speed, the means for yieldingly urging the body to rotate in the opposite direction being such that when the tensions in the two strands immediately in advance of the plying point are equal the power disconnecting and motion reversing means is in neutral, power disconnecting position.

8. Strand-twisting apparatus as claimed in claim 7, wherein the means for detecting the tension of the strand in the loop and the power disconnecting and motion reversing means are so constructed and arranged that when the tension of the first strand exceeds that of the second strand the apex guide is adjusted to decrease the height of the loop, and that when the tension of the second strand exceeds that of the first strand the apex guide is adjusted to increase the height of the loop.

9. Strand-twisting apparatus as claimed in claim 6, wherein the source of power comprises means driven by a travelling strand which is processed by said apparatus, said travelling strand comprising said yarn strand which travels through said loop.

10. Strand-twisting apparatus as claimed in claim 9, wherein the strand which drives the said driven means of the source of power is the yarn strand which is about to enter the loop.

11. Strand-twisting apparatus as claimed in claim 9, wherein the strand which drives the said driven means of the source of power comprises the yarn strand which is leaving the loop.

*12. Strand twisting apparatus comprising means for forming a loop in a travelling strand, an apex guide for the loop through which the strand enters the loop, means for rotating the loop, means for feeding the strand with respect to one end of the loop, an idle flyer disposed so that the portion of the loop between the apex guide and the flyer always rotates in the first quadrant, and means for controlling the tension of the strand in the loop comprising tension sensitive means disposed to engage the run of the strand extending between the feeding means and the loop, movable means for controlling the size of the loop, a separate source of power for selectively driving the movable means, and means responsive to the tension sensitive means for controlling the application of power from said separate power source to the movable means for controlling the size of the loop.*

*13. Strand twisting apparatus as claimed in claim 12, wherein the means for feeding the strand is disposed to feed the strand into the loop.*

*14. Apparatus as claimed in claim 12, wherein the tension sensitive means comprises a body with a surface upon which the strand slips, the strand imposing a torque upon said surface as the strand travels thereover, and comprising means opposing rotation of the body by the strand.*

*15. Apparatus as claimed in claim 14, wherein said strand surface imposes a greater torque upon the surface when the tension of the strand in the loop increases and imposes a smaller torque upon the surface when the tension of the strand in the loop decreases.*

*16. Strand twisting apparatus as claimed in claim 12, wherein the means for controlling the tension of the strand in the loop changes the size of the loop in response to variations in the force of engagement between the strand and the said surface of the body.*

*17. Strand twisting apparatus as claimed in claim 12, whrein the apparatus is of the skip twisting plying type, and comprising a source of a second yarn strand within the loop of the first mentioned yarn strand, means for conducting the second strand from its source to a point where it is plied with the first strand adjacent the location at which the first strand leaves the loop, means for subjecting the second strand to tension in the run thereof extending to the plying point, and means beyond the plying point for taking up the resulting plied cord under tension.*

*18. Strand twisting apparatus as claimed in claim 17, wherein the strand-cord system consisting of the first strand from its feeding means to the plying point, the second strand from its tensioning means to the plying point, and the cord from the plying point to the cord take up means is held under tension with the loop as the only portion of the system in a resiliently held salient run, and the means for controlling the tension of the strand in the loop changes the size of the loop in re-*

*sponse to variations in the tension of the strand in the loop.*

References Cited

The following references, cited by the Examiner, are of record in the patented file of this patent or the original patent.

UNITED STATES PATENTS

| | | | |
|---|---|---|---|
| Re 24,380 | 10/1957 | Vibber | 57—58.3 |
| 2,729,051 | 1/1956 | Clarkson | 57—58.3 |

| | | | |
|---|---|---|---|
| 2,736,160 | 2/1956 | Vibber | 57—58.3 |
| 2,857,730 | 10/1958 | Vibber | 57—58.3 |
| 2,871,648 | 2/1959 | Vibber | 57—58.83 |
| 3,153,893 | 10/1964 | Vibber | 57—58.3 |
| 3,192,698 | 7/1965 | Vibber | 57—58.83 |

DONALD E. WATKINS, Primary Examiner

U.S. Cl. X.R.

57—58.83, 58.86